M. F. MEAD.
FENCE REPAIRING IMPLEMENT.
APPLICATION FILED MAY 12, 1911.

1,021,324.

Patented Mar. 26, 1912.

UNITED STATES PATENT OFFICE.

MARION F. MEAD, OF GEDDES, SOUTH DAKOTA.

FENCE-REPAIRING IMPLEMENT.

1,021,324.      Specification of Letters Patent.      Patented Mar. 26, 1912.

Application filed May 12, 1911. Serial No. 626,871.

*To all whom it may concern:*

Be it known that I, MARION F. MEAD, a citizen of the United States, residing at Geddes, in the county of Charles Mix and State of South Dakota, have invented certain new and useful Improvements in Fence-Repairing Implements; and I do hereby declare the following to be a full, clear, and exact description of the invention, such as will enable others skilled in the art to which it appertains to make and use the same.

My invention relates to a device for use in repairing wire fences. Its object is to provide a tool or implement which can be effectively employed to press and hold back the wires while a fence post is being replaced.

To this end it comprises the combination of features and elements set forth in the appended claims.

Figure 1:
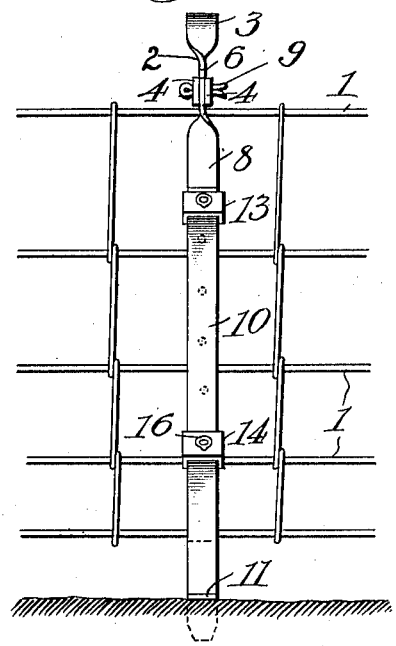
Figure 2:
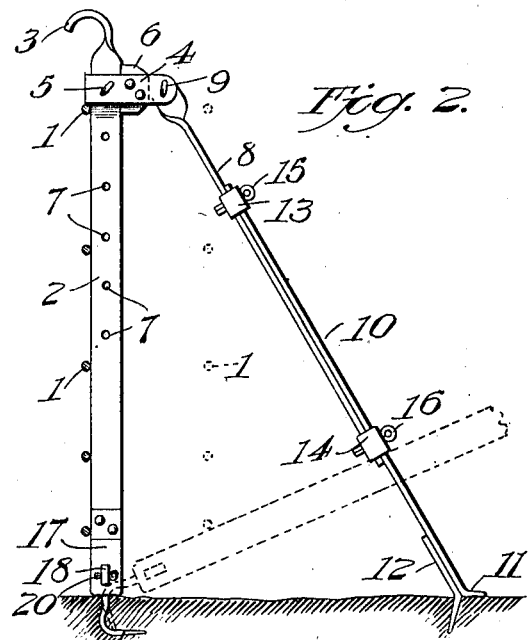
Figures 3, 4:
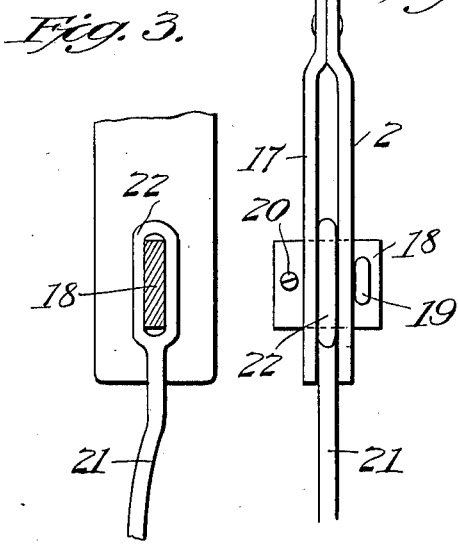
Figure 5:
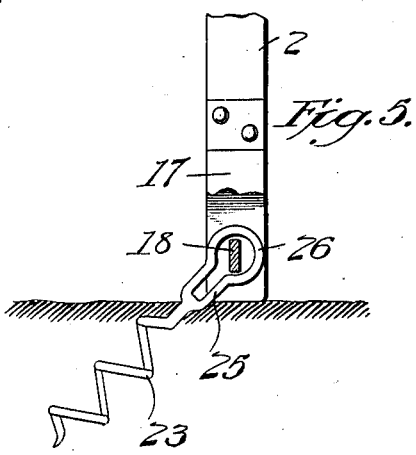

In the drawing Figure 1 is a front elevation with the implement in place against the strands of a wire fence. Fig. 2 is a side elevation showing the mode of putting the instrument in place and its relative action upon the strands of wire of a fence. Fig. 3 is a detail showing the mode of connection of the securing hook. Fig. 4 is a partial front elevation illustrating the same attachment. Fig. 5 is a detail partially in section showing the securing screw.

1 represents the strands of a wire fence, which, in Fig. 2, are shown in two positions.

2 is an upright face bar having, preferably, a hook 3 at the top to prevent any wire from escaping over the top of the bar and to serve as a convenient handle.

4 is a connecting bar, shown in the illustration in the form of a loop, secured to the bar 2 by a removable pin 5, and embracing a bearing and guiding block 6, which is attached to the bar 4 and bears against the back of the bar 2. The bar 4 is adjustable upon the bar 2 by means of perforations 7. A brace-bar 8 is pivoted by a pin 9 to the bar 4 and bears an extensible part 10. The extension part 10 is curved upwardly at the bottom as indicated at 11. Secured to the bottom of the part 11 is a bent piece 12, sharpened at the bottom. The parts 11 and 12 serve as an efficient foot-piece, the part 12 being forced into the ground while the part 11 lies upon the surface. A clamping loop 13 is secured to the top of the extension piece 10 and a similar clamping piece 14 is secured to the bottom of the bar 8. A spring-pin may be passed through either one or both of these clamps for the purpose of securing the two bars together after the attachment is made. In the illustration I have shown two pins 15 and 16.

To the bottom of the bar 2 is secured a bent out foot-piece 17. A short bar or block 18 passes through the bar 2 and the foot-piece 17 and bears two spring-pins 19 and 20, one on the side of the bar 2 and the other on the side of the foot-piece 17. The bar 18 serves as a support and bearing piece either for a hook 21 or a screw 23. The hook 21 has an eye 22 of polygonal form, that is, having flat sides so that the hook is held firmly in place and is not permitted to swing on the bar 18. The screw 23, however, has its shank in two parts, one flat-sided to fit the bar 18 and the upper part circular so that the shank may turn about the bar 18. The purpose of these features will be obvious in the succeeding description of the operation.

When the implement is to be used, if the ground is a thick sod or similar substance then the hook 21 can be used. The implement is applied as indicated in dotted lines in Fig. 2, the hook being pushed under the fence beyond the post, then as the bar 2 is brought from its dotted position to the position shown in full lines the hook is forced into the sod, as indicated in full lines in Fig. 2, serving thus to hold the bar 2 in position. The brace-bar has been sufficiently extended to fit the situation and when the bar 2 is upright the brace-bar is forced down into the ground, the projection 12 entering the ground, the bent portion 11 lying upon the ground. The wires are thus forced from the position indicated in dotted lines in Fig. 2 to that shown in sectional lines in the same figure, so that they are held clear from the way of the workman, who is thus free to put in the post without annoyance from the wires, a point of great importance, especially in case of barbed-wire. When the hook is used it is necessary to hold it rigid so that it may assume its proper position as the implement is brought to the upright position. When the screw, however, is used it can be turned into the ground by the operation of the bar 18 upon the flat part 25 of the shank and when it is in place the bar 2 may be lifted until the bar 18 comes into the circular part 26 of the shank, whereupon the bar 2 may then turn on an axis and be brought to upright position without disturbing the screw.

I claim,—

1. In a fence-repairing implement, the combination of a wire-engaging lever-bar, means for securing it to the ground, and a brace-bar for holding the wire-engaging lever-bar upright and pressed against the wires.

2. In a fence-repairing implement, the combination of a wire-engaging lever-bar, means for securing it to the ground, and a brace-bar adjustably secured to the wire-engaging lever-bar, and means for holding the brace-bar in engagement with the ground while supporting and pressing forward the wire-engaging lever-bar.

3. In a fence-repairing implement, the combination of a wire-engaging lever-bar having at the bottom a depending device for engaging the ground, an extensible brace-bar secured to the wire-engaging lever-bar and serving to hold the wire-engaging lever-bar upright and under pressure against the wires.

4. In a fence-repairing implement, the combination of a wire-engaging lever-bar having a divided or open foot-piece, removable attaching means secured to the foot-piece, a ground-engaging device secured to the wire-engaging lever-bar by the attaching means, and an adjustable brace-bar pivoted to the wire-engaging lever-bar.

5. In a fence-repairing implement, the combination of a wire-engaging lever-bar having at the bottom a transverse bar, an attaching screw having a shank which is partially rectangular and partially circular, the shank engaging the transverse bar and an extensible and adjustable brace-bar secured to the wire-engaging lever-bar.

6. In a fence-repairing implement, the combination of a wire-engaging lever-bar having at the bottom devices for securing the lever-bar to the ground and an extensible brace-bar having at the bottom bent parts, one of which enters the ground and the other of which lies upon the ground to hold the brace-bar in position while holding forward the wire-engaging lever-bar in engagement with the wires.

In testimony whereof I have hereunto signed my name in the presence of two subscribing witnesses.

MARION F. MEAD.

Witnesses:
A. Brady Beck,
Walter M. Shuck.

---

Copies of this patent may be obtained for five cents each, by addressing the "Commissioner of Patents, Washington, D. C."